United States Patent
Naegele et al.

(10) Patent No.: US 6,810,746 B2
(45) Date of Patent: Nov. 2, 2004

(54) SENSOR ARRANGEMENT WITH PRESSURE DETECTOR AND SENSOR CIRCUIT

(75) Inventors: Erwin Naegele, Hessigheim (DE); Martin Knapp, Kirchentellinsfurt (DE); Wolfgang E. Mueller, Leonberg (DE); Andreas Fischer, Wannweil (DE); Joerg Gebers, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/239,817

(22) PCT Filed: Mar. 23, 2001

(86) PCT No.: PCT/DE01/01119
§ 371 (c)(1),
(2), (4) Date: Dec. 9, 2002

(87) PCT Pub. No.: WO01/73391
PCT Pub. Date: Oct. 4, 2001

(65) Prior Publication Data
US 2003/0233881 A1 Dec. 25, 2003

(30) Foreign Application Priority Data
Mar. 25, 2000 (DE) .......................... 100 14 992

(51) Int. Cl.⁷ .............................................. G01L 7/08
(52) U.S. Cl. .............................. 73/715; 73/753; 73/756
(58) Field of Search .................................. 73/700–756

(56) References Cited
U.S. PATENT DOCUMENTS

| | | | | |
|---|---|---|---|---|
| 4,536,820 A | | 8/1985 | Binder | |
| 5,438,876 A | * | 8/1995 | Lewis | ......................... 73/726 |
| 5,548,482 A | * | 8/1996 | Hatauchi et al. | ............ 361/720 |
| 5,656,780 A | * | 8/1997 | Park | ............................. 73/724 |
| 5,802,912 A | * | 9/1998 | Pitzer et al. | ................... 73/756 |
| 5,974,893 A | * | 11/1999 | Balcarek et al. | ............... 73/714 |
| 6,125,707 A | * | 10/2000 | Haga et al. | .................... 73/745 |
| 6,131,467 A | * | 10/2000 | Miyano et al. | ................ 73/756 |
| 6,212,955 B1 | * | 4/2001 | Tanaka et al. | ................. 73/718 |

FOREIGN PATENT DOCUMENTS

| | | | | |
|---|---|---|---|---|
| DE | 196 03 674 A1 | | 8/1997 | |
| JP | 61209334 A | * | 9/1986 | ............ G01L/23/10 |
| JP | 08320267 A | * | 12/1996 | ............. G01L/9/12 |

* cited by examiner

*Primary Examiner*—Edward Lefkowitz
*Assistant Examiner*—Jermaine Jenkins
(74) *Attorney, Agent, or Firm*—Michael J. Striker

(57) ABSTRACT

A sensor arrangement has a housing, a pressure detector having a measuring diaphragm which is deflectable by a pressurized measurement medium, a sensor circuit attached directly to the measuring diaphragm, an electronic evaluation circuit connected to the sensor circuit and formed as a hybrid circuit, a connector contacted by an element selected from the group consisting of the sensor circuit, the evaluation circuit and both, the hybrid circuit being fastened directly to the measuring diaphragm by a conductive glue which produces electrical connections between the hybrid circuit and the sensor circuit fastened to the measuring diaphragm and produces a ground connection to the housing.

9 Claims, 1 Drawing Sheet

SENSOR ARRANGEMENT WITH PRESSURE DETECTOR AND SENSOR CIRCUIT

BACKGROUND OF THE INVENTION

The present invention relates to a sensor arrangement, in particular for a high-pressure sensor.

For example, DE 196 03 674.7 A1 has disclosed a pressure sensor in which the signal detection is executed by means of a pressure detector made of stainless steel, in which a resistance measuring bridge is disposed on the side of a measuring diaphragm oriented away from the measurement medium, for example using the thin-film technique. Movements of the measuring diaphragm due to pressure changes in the measurement medium therefore lead to compressions or elongations of the resistance bridges and therefore to resistance changes in the respective resistors. This resistance change and the signal amplification are utilized by an electronic evaluation circuit, which is disposed on a printed circuit board.

In this instance, the contacting of the pressure detector with the evaluation circuit is produced by means of a soldered, flexible foil strip conductor or optionally also by means of an additional intermediate member, a so-called spacer. By means of bonded connections, the pressure detector contacts this spacer and the evaluation circuit disposed on the spacer is soldered in place. The contacting of the evaluation circuit with the connector attached to the sensor unit is produced either by means of soldered, flexible lines or directly by means of connector pins, which are sealed in the transition to the housing of the sensor arrangement by means of soft rubber.

In the manufacture of a pressure sensor of this kind, an inexpensive, structurally simpler sensor design should be provided, which is suitable for high vibrational stresses and temperature stresses and for high-pressure measurement in aggressive mediums such as oil, diesel, gasoline, or brake fluid in motor vehicles.

U.S. Pat. No. 5,656,780 has disclosed a sensor arrangement that includes a pressure detector. Electronic sensor structures are produced on the underside of an insulator substrate, which is inserted into the housing of the sensor arrangement. A hybrid circuit is disposed on the top side of the insulator substrate and contacts the sensor structures on the underside by means of through contacts. The insulator substrate is placed with the sensor structures onto the measuring diaphragm.

SUMMARY OF THE INVENTION

The sensor arrangement in the modification according to the invention is advantageous in that the evaluation circuit, as a hybrid circuit, can be fastened directly to the sensor circuit, i.e. to the measuring bridge on the measuring diaphragm, thus produce electrical connections between the evaluation circuit and the sensor circuit and a ground connection to the housing of the sensor arrangement.

According to a particularly advantageous embodiment, the contacting of the connections of the hybrid circuit with the connector pins of the connector in the sensor arrangement can be produced by means of pressure contacts. The pressure contacts can simply be either S-shaped leaf springs or helical compression springs; the helical springs are guided in a sleeve that serves as a retainer and is disposed on either the hybrid circuit or the connector.

The electronic evaluation circuit according to the invention is produced using intrinsically known hybrid technology, e.g. as an ASIC, and can be connected by means of a glue connection, directly to a detector that supports the measuring diaphragm. The necessary electrical connection to the housing ground of the sensor arrangement is advantageously produced without additional components. Required soldering or bonding processes can therefore be eliminated since the electrical connections can be produced at the same time as the fastening of the hybrid circuit. In addition, the flexible foils required in the prior art or an intermediate member, a so-called spacer, are not necessary here, which represents a considerable cost savings.

Other advantages of the arrangement according to the invention are the very short and symmetrical electrical connections between the measuring bridge and the evaluation circuit. This achieves a very favorable compatibility with electromagnetic irradiation. The resulting compact design reduces not only the number of electrical connecting elements, but also the number of possible failure sources, which extends the service life of the sensor arrangement. In addition, the compact design has fewer oscillation-prone mechanical parts and the sensor arrangement is more able to withstand vibration.

The helical compression springs or the S-shaped leaf springs permit a simple, automated assembly of the connector.

It is particularly advantageous if the pressure detector is mounted on a multi-part pressure fitting in which the detector is first fastened to a threaded fitting, which can be screw connected to a subassembly for the introduction of the measurement medium. The threaded fitting is connected to a base housing.

The thus divided pressure fitting, in which the base body and the threaded fitting can be produced separately, achieves a smaller overall height of the sensor arrangement since the pressure detector can initially be welded radially to the threaded fitting, without the base body. It is therefore less expensive to produce the pressure fitting and the threaded fitting requires considerably less cutting work than in the one-piece embodiment.

It is also advantageous if the threaded fitting is then welded to the base housing at its threaded end. The base housing here can easily be embodied as a hexagonal housing, which is advantageous for the installation on a subassembly; either a milled or a particularly inexpensive deep-drawn part can be used for this. A hexagonal housing of this kind can be comprised of weaker and therefore less expensive material than the pressure fitting. In addition, the consequently produced metallic encasing of the evaluation circuit means that an improved EMV behavior of the sensor arrangement can be expected; this is particularly advantageous with small signal strokes of the pressure detector.

On the whole, the partite pressure fitting minimizes an introduction of mechanical stress into the detector and therefore a signal drift due to the starting torque, and the separate base housing makes it possible to use a shorter connector made of plastic, which improves its mechanical connection and therefore improves the capacity of the entire arrangement to withstand vibration.

The sensor arrangement can preferably be a high-pressure sensor for detecting the pressure of oil, diesel, gasoline, or brake fluid in a motor vehicle.

These and other features of preferred modifications of the invention ensue from not only the claims, but also from the specification and the drawings, in which the individual features can each be realized in and of themselves or united in various sub-combinations in the embodiment of the invention and in other fields and can also prove to be advantageous for intrinsically patentable embodiments, for which protection is hereby claimed.

BRIEF DESCRIPTION OF THE DRAWINGS

Exemplary embodiments of a sensor arrangement according to the invention for a high-pressure sensor will be explained below in conjunction with the drawings.

DESCRIPTION OF THE PREFERRED EMBODIMENTS

Figure 1:
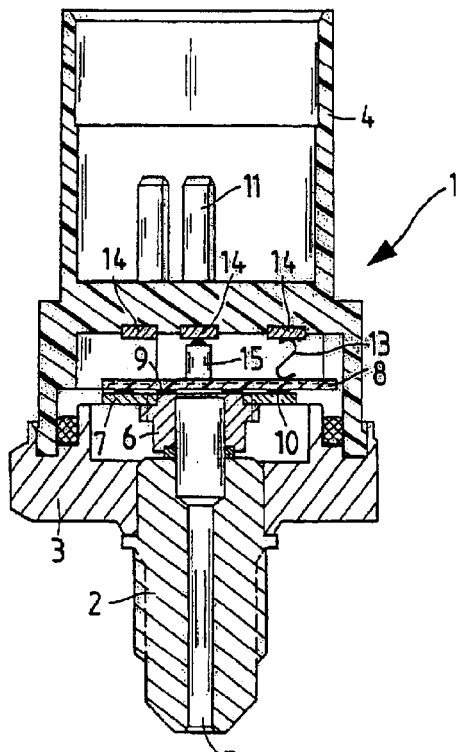
FIG. 1 shows a section through a first exemplary embodiment of a high-pressure sensor with a hybrid circuit in a pressure detector, which is fastened to a hexagonal housing by means of a separate threaded fitting.

FIG. 1 shows a high-pressure sensor 1 whose housing parts are comprised of a threaded fitting 2, a hexagonal housing 3, and connector 4. With the hexagonal housing 3, the entire arrangement can be screw connected by means of the threaded fitting 2 to a subassembly or a pressure-carrying line, e.g. a rail. The connector 4 can be tightly inserted into the hexagonal housing 3 by means of seals or other connecting methods.

The threaded fitting 2 contains an inlet 5 for the pressurized medium to be measured and a pressure detector 6 with a measuring diaphragm is disposed at the end of the inlet 5. The pressure detector 6 is radially welded to the threaded fitting 2.

In this instance, the pressure detector 6 is connected to a metal disk 7 or a metal sleeve in an electrically conductive manner so that the disk or sleeve end face forms a plane with the diaphragm surface on which is disposed a resistance bridge that functions in an intrinsically known fashion. The body thus formed is attached to the printed circuit board with a hybrid circuit 8 as an evaluation circuit.

On the side oriented toward the pressure detector 6, the hybrid circuit 8, e.g. a so-called ASIC, has contact surfaces 9 and 10, which are electrically connected to the opposing component side by means of through contacts. The contact surfaces 9 are geometrically disposed so that they produce an electrical connection with the contact surfaces of the resistance bridge on the pressure detector 6. On the possibly circumferential contact surface 10, the contact for the housing ground is produced by means of the metal disk 7.

In the exemplary embodiment shown, the hybrid circuit 8 is glued to the contact surfaces 9 and 10 on the pressure detector 6 and the metal disk 7 or sleeve by means of a conductive glue. In a simple manner, this produces the contacting of the hybrid circuit 8 with the housing ground and the resistance bridge and produces the fastening of the hybrid circuit 8.

In the exemplary embodiment according to FIG. 1, the electrical connection from a hybrid circuit 8 to the connector pins 11 in the connector 4 is produced, for example, by means of a compression spring or an S-shaped leaf spring 13. One side of the leaf spring 13 in this case is glued directly to the hybrid circuit 8 with a conductive glue and is contacted on the other side by connector contacts 14 of the connector pins 11. At the contact with the compression spring, a sleeve 15 is glued to the hybrid circuit 8 as a retainer.

Figure 2:
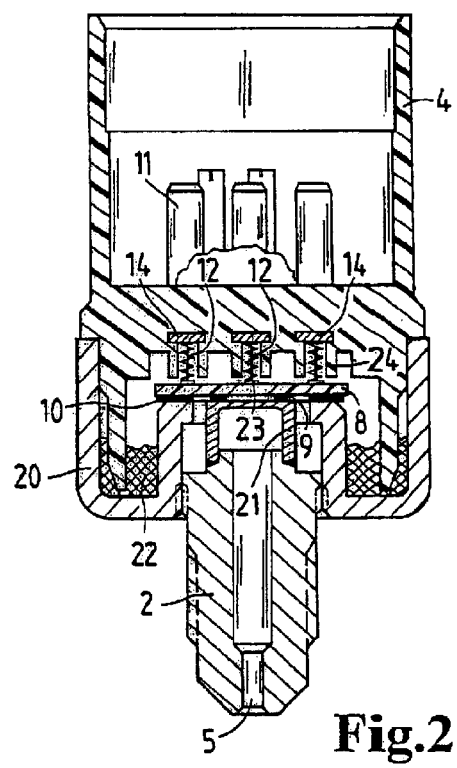
FIG. 2 shows a modification of the exemplary embodiment according to FIG. 1, with a deep-drawn part as the hexagonal housing.
Figure 3:
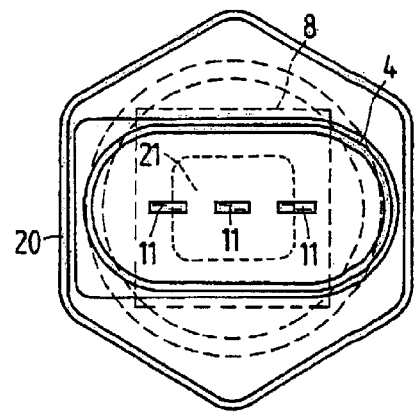
FIG. 3 shows a cross section through the hexagonal housing according to FIG. 2.

FIGS. 2 and 3 show an exemplary embodiment in which a hexagonal housing 20 is produced as a deep-drawn part. Structural components that are the same or function the same manner are provided with the same reference numerals here as in FIG. 1. A pressure detector 21 is correspondingly embodied so as to simply adapt geometrically to this embodiment and the connector 4 is secured to the hexagonal housing 20 by means of glue 22.

The contacting of the hybrid circuit with the connector pins 11 in this case is produced by means of contacts 23 and helical compression springs 12, which are secured to the connector 4 in corresponding sleeves 24.

What is claimed is:

1. A sensor arrangement, comprising a housing; a pressure detector having a measuring diaphragm which is deflectable by a pressurized measurement medium; a sensor circuit attached directly to said measuring diaphragm; an electronic evaluation circuit connected to said sensor circuit and formed as a hybrid circuit; a connector contacted by an element selected from the group consisting of said sensor circuit, said evaluation circuit and both, said hybrid circuit being fastened directly to said measuring diaphragm by a conductive glue which produces electrical connections between said hybrid circuit and said sensor circuit fastened to said measuring diaphragm and produces a ground connection to said housing.

2. A sensor arrangement as defined in claim 1, wherein said connector has connector pins; and further comprising pressure contacts producing contacting of connections of said hybrid circuit with said connector pins of said connector.

3. A sensor arrangement as defined in claim 2, wherein said pressure contacts are formed as S-shaped leaf springs.

4. A sensor arrangement as defined in claim 3; and further comprising a sleeve formed as a retainer and provided on an element selected from the group consisting of said hybrid circuit and said connector, said pressure contacts being formed as helical compression springs which are guided in said sleeve.

5. A sensor arrangement as defined in claim 1; and further comprising a threaded fitting which is screw connectable to an element selected from the group consisting of a subassembly and a line for introduction of said measuring medium; a multi-part pressure fitting in which said pressure detector is fastened to said threaded fitting and in which said pressure detector is secured, said threaded fitting being connected to said housing which mounts the sensor arrangement and contains said connector.

6. A sensor arrangement as defined in claim 5, wherein said threaded connector is welded at its threaded end to said housing, said pressure detector being radially welded to said threaded fitting.

7. A sensor arrangement as defined in claim 1, wherein said housing is formed as a hexagonal housing.

8. A sensor arrangement as defined in claim 7, wherein said hexagonal housing is formed as a deep-drawn part.

9. A sensor arrangement as defined in claim 1, wherein the sensor arrangement is formed as a high-pressure sensor for detecting a pressure of a fluid selected from the group consisting of oil, diesel, gasoline and brake fluid in a motor vehicle.

* * * * *